April 29, 1924.
L. ROSENWALD
FLOWER SUPPORT
Filed April 21, 1921
1,491,926
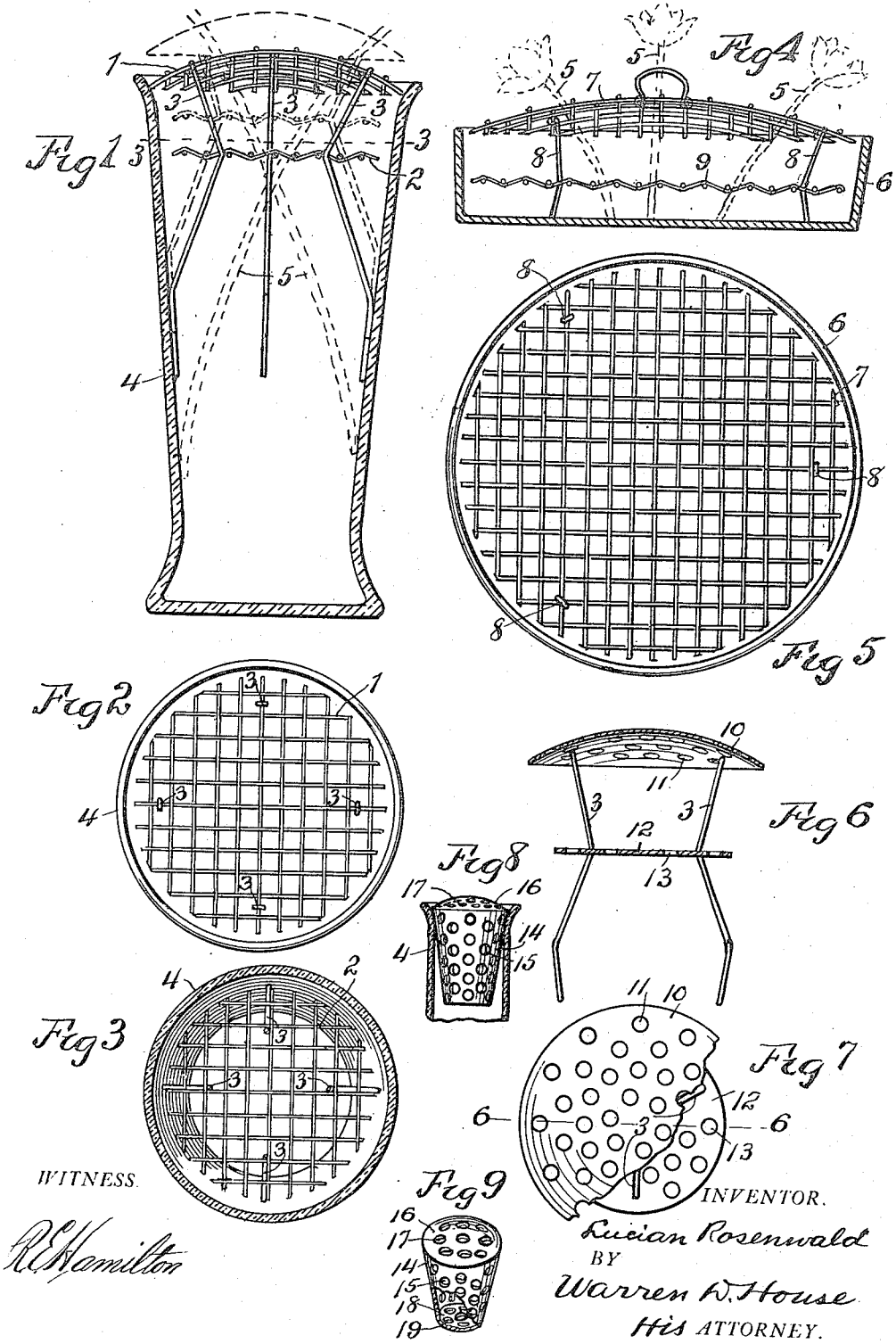
WITNESS.
R. E. Hamilton
INVENTOR.
Lucian Rosenwald
BY
Warren W. House
His ATTORNEY.

Patented Apr. 29, 1924.

1,491,926

UNITED STATES PATENT OFFICE.

LUCIAN ROSENWALD, OF KANSAS CITY, MISSOURI.

FLOWER SUPPORT.

Application filed April 21, 1921. Serial No. 463,130.

*To all whom it may concern:*

Be it known that I, LUCIAN ROSENWALD, a citizen of the United States, residing at Kansas City, in the county of Jackson and State of Missouri, have invented a certain new and useful Improvement in Flower Supports, of which the following is a specification.

My invention relates to improvements in flower supports.

The object of my invention is to provide novel means for supporting flowers in a vase or similar receptacle at different angles and in spaced relationship with each other, whereby any desired form may be given to a bunch of flowers and by which the flowers will be reliably held in the positions to which they may be adjusted.

My invention provides further an attachment of the kind described which is cheap to make, durable, not liable to get out of order, and which may be vertically adjustable to different positions in a vase to which it is adapted.

The novel features of my invention are hereinafter fully described and claimed.

In the accompanying drawings, which illustrates my invention,

Fig. 1 is a vertical sectional view of a vase having my improved flower support mounted therein.

Fig. 2 is a top view of the same.

Fig. 3 is a horizontal section on the line 3—3 of Fig. 1.

Fig. 4 is a modification of a type applied to a shallow receptacle.

Fig. 5 is a top view of what is shown in Fig. 4.

Fig. 6 is a vertical sectional view on the line 6—6 of Fig. 7 showing a modification in which the perforate mmebers are composed of perforated sheet metal.

Fig. 7 is a top view, partly broken away, of what is shown in Fig. 6.

Fig. 8 is a side elevation of another form, shown mounted in a vase, the upper part of which is shown.

Fig. 9 is a perspective view, partly broken away, of what is shown in Fig. 8.

Similar reference characters designate similar parts in the different views.

1 and 2 designate respectively perforate transverse members disposed one above the other, the upper member 1 being preferably concavo-convex with its convex side up.

The members 1 and 2 are spaced apart and are attached to and supported by a plurality of members 3, preferably resilient wires which extend downwardly from the member 2, and are adapted to frictionally and slidably engage the inner side walls of a vase 4, in which the members 1 and 2 are mounted, see Figs. 1 to 3. The members 1 and 2 are preferably composed of woven wire and are adapted to receive therethrough the stems of plants, said stems being designated by 5 and shown in dotted lines in Fig. 1.

The device may be mounted in the vase 4, in the position shown in solid lines in Fig. 1, in which position the upper member 1 rests in the upper end of the vase 4. By having the wires 3 resilient, and compressed toward each other when inserted in the vase 4, the wires will frictionally engage the inner walls of the vase 4, so as to support the device in different positions, as in a raised position shown in dotted lines in Fig. 1.

The stems 5 of the plants are inserted through the openings between the wires in both the members 1 and 2. By means of the construction shown, the stems may be disposed at any desired angles and will be retained in the positions to which they are adjusted, even though the vase be subjected to rather rough handling. The wires being round, will not cut or injure the stems.

By having the upper member 1 convex on its upper side, it may be used to give a rounded contour to the upper side of a bunch of flowers, the stems of which extend through said two members 1 and 2.

In Figs. 4 and 5, is shown a modification adapted for use in a relatively wide and shallow receptacle 6. In this form of my invention, the upper concavo-convex wire member 7 is supported by three wire legs 8, the lower ends of which rest upon the bottom of the vessel 6. Below and spaced apart from the member 7 is a transverse woven wire member 9, corresponding to the member 2, and supported by the legs 8 above the bottom of the receptacle 6. In this form of my invention, the stems 5 are inserted through the members 7 and 9, and are disposed at such angles as may be desired.

In Figs. 6 and 7, is shown another modification of my invention in which the upper concavo-convex member 10 is a perforated metal plate having perforations 11, adapted to receive stems therethrough. The plate 10 is supported by resilient wires 3, which are adapted, as are the wires 3, in Fig. 1, to be frictionally engaged with the inner walls of a vase.

Below and spaced apart from the member 10 is a flat transverse plate 12, having perforations 13, adapted to receive therethrough stems which are extended through the holes 11. The operation of the device shown in Figs. 6 and 7, is the same as that described with relation to the device shown in Figs. 1 to 3.

In Figs. 8 and 9 is shown another modification comprising a metal cup having upwardly flaring side walls 14, preferably provided with perforations 15. The upper end of the cup is provided with a concavo-convex cap or cover 16, having perforations 17, adapted to receive therethrough the stems of plants. The cup is provided with a bottom 18, having perforations 19, adapted to receive therethrough stems which extend through the perforations 17. The perforations 15 may also have extended through them stems which extend through the openings 17.

The cup just described is adapted to be mounted, as shown in Fig. 8, in the upper end of a vase 4.

In each form of my invention, each stem of a plant may be held at two spaced apart points, thereby preventing the stem being shifted from the position to which it may be adjusted. The upper and lower perforate members reliably hold the stems, even at angles only slightly inclined to the horizontal.

I do not limit my invention to the structure shown and described, as many modifications, other than those shown, may be made, within the scope of the appended claims, without departing from the spirit of my invention.

What I claim is:—

1. In a flower support, a perforate member adapted to receive stems therethrough, and a plurality of resilient members attached to and supporting said member and adapted to have their lower ends sprung inwardly or outwardly so as to engage and be supported by the inner side walls of a vase, substantially as set forth.

2. In a flower support, two perforate members, spaced apart one above the other and adapted each to receive therethrough the stems of plants, and a plurality of members connecting and adapted to support said perforate members and adapted to be supported by a vase, and extending below the lower perforate member and adapted to have their lower ends sprung inwardly or outwardly so as to engage the inner walls of the vase, substantially as set forth.

3. In a flower support, two perforate members spaced apart, one above the other, and adapted each to receive therethrough the stems of plants, and a plurality of resilient members connecting and adapted to support the perforate members and adapted to have their lower ends sprung inwardly or outwardly so as to engage the inner side walls of a vase so as to be supported thereby, substantially as set forth.

In testimony whereof I have signed my name to this specification.

LUCIAN ROSENWALD.